C. C. FARMER.
AIR STRAINER.
APPLICATION FILED SEPT. 21, 1915.

1,195,983.

Patented Aug. 29, 1916.

WITNESSES

INVENTOR
Clyde C. Farmer
by Wm. M. Cady
Att'y.

UNITED STATES PATENT OFFICE.

CLYDE C. FARMER, OF CHICAGO, ILLINOIS, ASSIGNOR TO THE WESTINGHOUSE AIR BRAKE COMPANY, OF WILMERDING, PENNSYLVANIA, A CORPORATION OF PENNSYLVANIA.

AIR-STRAINER.

1,195,983.   Specification of Letters Patent.   Patented Aug. 29, 1916.

Application filed September 21, 1915. Serial No. 51,829.

*To all whom it may concern:*

Be it known that I, CLYDE C. FARMER, a citizen of the United States, residing at Chicago, in the county of Cook and State of Illinois, have invented new and useful Improvements in Air-Strainers, of which the following is a specification.

This invention relates to strainers for fluid compressors and the principal object is to provide means for insuring the passage of fluid from the strainer to the compressor in case the strainer becomes clogged up.

Figure 2:
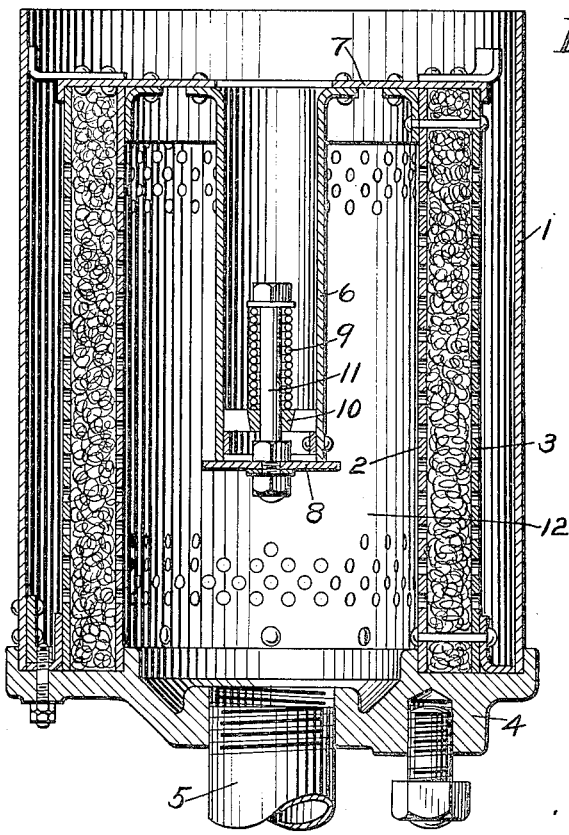
Figure 1:
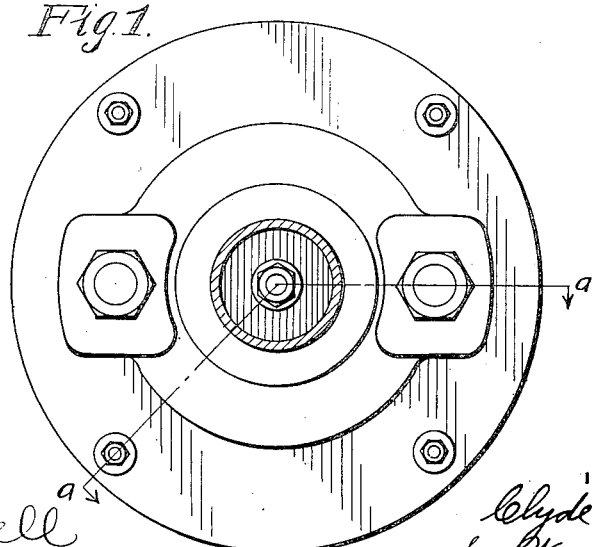

In the accompanying drawing; Figure 1 is an inverted plan view of a fluid strainer embodying my invention and Fig. 2 a vertical section on the line *a—a* of Fig. 1.

My improvement may be applied to various forms of air strainers and in order to illustrate one application, I have shown my invention as applied to a cylindrical strainer comprising an outer cylindrical casing 1 within which are mounted concentric cylindrical casings 2 and 3 having the intermediate space packed with a suitable filter material, such as curled hair. The casings 2 and 3 are made of perforated sheets, so that fluid can pass through, and the three casings are secured to a base plate 4 having a pipe 5 which leads to the intake of the compressor.

According to my invention, a centrally arranged tubular member 6 is secured to a top plate 7, the outer end opening to the atmosphere, and a valve 8 being provided for normally closing the inner end. The valve 8 is normally held closed by a spring 9 which bears at one end against a spider 10 secured within the member 6 and engages at the opposite end the head of a bolt 11, which is secured to the valve 8.

In the normal operation of the air strainer, fluid passes from the atmosphere to the space between the outer casing 1 and the perforated casing 3 and thence through the perforations of the casing 3 to the filter material between the casings 2 and 3. The purified fuel then flows through the perforations of the inner casing 2 to the central chamber 12 of the strainer and thence to the intake pipe 5 of the compressor. If the strainer should become clogged, then the flow of air through the strainer will reduce and should the air supply passing through the filter material be insufficient, the suction of the compressor will create a partial vacuum in the chamber 12, so that the atmospheric pressure acting within the tubular member 6 against the valve 8 will be sufficient to open the valve. A direct supply of air from the atmosphere is thus provided in case the strainer becomes clogged up, so that the necessary flow of fluid to the compressor is always assured.

Having now described my invention, what I claim as new and desire to secure by Letters Patent, is:

1. The combination with a fluid strainer for fluid compressors, of a by-pass for supplying fluid to the compressor in case the strainer becomes clogged.

2. The combination with a fluid strainer for a fluid compressor having a filter material through which fluid normally passes, of a valve adapted to be opened by the action of the compressor suction for supplying fluid to the compressor when the filter material becomes clogged.

3. The combination with a fluid strainer for a fluid compressor having a filter material through which fluid is normally supplied to the suction intake of the compressor, of a valve opened by atmospheric pressure under a partial vacuum created by the suction of the pump for supplying fluid to the compressor when the strainer becomes clogged.

4. The combination with a fluid strainer for a fluid compressor comprising a casing having a chamber connected to the suction intake of the compressor and means containing filter material for purifying fluid passing from the atmosphere to said chamber, of a tubular member extending into said chamber and a valve in said member subject on one side to atmospheric pressure and on the opposite side to the pressure in said chamber and adapted to be opened by atmospheric pressure during the suction stroke of the compressor when the filter material becomes clogged.

In testimony whereof I have hereunto set my hand.

CLYDE C. FARMER.

Witnesses:
C. J. OLMSTEAD,
F. B. FARMER.